United States Patent
Shimizu et al.

(10) Patent No.: US 10,688,871 B2
(45) Date of Patent: Jun. 23, 2020

(54) REGENERATIVE BRAKING CONTROL APPARATUS FOR ELECTRICALLY DRIVEN VEHICLE

(71) Applicant: MITSUBISHI JIDOSHA KOGYO KABUSHIKI KAISHA, Tokyo (JP)

(72) Inventors: Ryo Shimizu, Tokyo (JP); Kazunori Handa, Tokyo (JP); Norihiko Ikoma, Tokyo (JP); Yoshinori Tomita, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 186 days.

(21) Appl. No.: 15/762,216

(22) PCT Filed: Sep. 2, 2016

(86) PCT No.: PCT/JP2016/075820
§ 371 (c)(1),
(2) Date: Mar. 22, 2018

(87) PCT Pub. No.: WO2017/061197
PCT Pub. Date: Apr. 13, 2017

(65) Prior Publication Data
US 2018/0201140 A1  Jul. 19, 2018

(30) Foreign Application Priority Data
Oct. 7, 2015  (JP) .................. 2015-199252

(51) Int. Cl.
*B60L 7/18*  (2006.01)
*B60L 15/20*  (2006.01)
(Continued)

(52) U.S. Cl.
CPC ............... *B60L 7/18* (2013.01); *B60L 3/0061* (2013.01); *B60L 3/0076* (2013.01);
(Continued)

(58) Field of Classification Search
CPC ........ B60L 58/12; B60L 7/18; B60L 15/2009; B60L 3/0076; B60L 3/0061; B60T 7/22;
(Continued)

(56) References Cited

U.S. PATENT DOCUMENTS 5,399,000 A * 3/1995 Aoki .................. B60L 7/26
                                                180/165
5,927,829 A * 7/1999 Saga .................. B60T 8/448
                                                180/165
(Continued)

FOREIGN PATENT DOCUMENTS

JP   3714164 B2   11/2005
JP   2007-22527 A   2/2007
WO   WO 2014/064730 A1   5/2014

OTHER PUBLICATIONS

Extended European Search Report dated Dec. 13, 2018 in corresponding European Patent Application No. 16853351.1.

*Primary Examiner* — Mussa A Shaawat
(74) *Attorney, Agent, or Firm* — Birch, Stewart, Kolasch & Birch, LLP

(57) ABSTRACT

A regenerative braking control apparatus equipped on an electrically driven vehicle having road wheels and an electric motor for driving the road wheels for running. An operation unit is provided for the driver of the vehicle to select a magnitude of the braking force to be generated by the electric motor during regenerative braking. A determination unit determines, on the basis of conditions of the electrically driven vehicle, whether or not a selected braking force selected through the operation unit is acceptable. A notifier unit is constructed such that, in a case where the selected braking force is determined to be unacceptable by the determination unit, the notifier unit provides a corresponding notification to the driver.

19 Claims, 4 Drawing Sheets

(51) Int. Cl.
  *B60L 3/00* (2019.01)
  *B60T 17/22* (2006.01)
  *B60T 7/08* (2006.01)
  *B60T 7/12* (2006.01)
  *B60T 8/172* (2006.01)
  *F16D 61/00* (2006.01)
  *B60T 1/10* (2006.01)
  *B60L 58/12* (2019.01)
  *B60T 7/22* (2006.01)

(52) U.S. Cl.
  CPC .......... *B60L 15/2009* (2013.01); *B60L 58/12* (2019.02); *B60T 1/10* (2013.01); *B60T 7/085* (2013.01); *B60T 7/12* (2013.01); *B60T 7/22* (2013.01); *B60T 8/172* (2013.01); *B60T 17/221* (2013.01); *F16D 61/00* (2013.01); *B60L 2240/423* (2013.01); *B60L 2240/54* (2013.01); *B60L 2250/10* (2013.01); *B60L 2250/16* (2013.01); *B60T 2210/12* (2013.01); *B60T 2270/40* (2013.01); *B60T 2270/402* (2013.01); *B60T 2270/60* (2013.01); *B60T 2270/604* (2013.01); *Y02T 10/7258* (2013.01)

(58) Field of Classification Search
  CPC . B60T 8/172; B60T 7/12; B60T 7/085; B60T 1/10; B60T 2270/402; F16D 61/00
  See application file for complete search history.

(56) References Cited

U.S. PATENT DOCUMENTS

| | | | |
|---|---|---|---|
| 6,459,980 B1 | 10/2002 | Tabata et al. | |
| 9,457,668 B2 | 10/2016 | Matsuda | |
| 2005/0073315 A1* | 4/2005 | Murakami | G01R 31/3842 324/433 |
| 2007/0267915 A1* | 11/2007 | Shimada | B60K 6/44 303/122 |
| 2008/0185199 A1* | 8/2008 | Kimura | B60K 6/445 180/242 |
| 2008/0293538 A1* | 11/2008 | Saito | B60K 6/365 477/3 |
| 2008/0314661 A1* | 12/2008 | Soliman | B60W 10/18 180/65.245 |
| 2008/0318728 A1* | 12/2008 | Soliman | B60L 50/16 477/4 |
| 2009/0145673 A1* | 6/2009 | Soliman | B60W 20/13 180/65.1 |
| 2009/0150035 A1* | 6/2009 | Soliman | B60W 20/15 701/54 |
| 2011/0320067 A1* | 12/2011 | Ishikawa | B60T 1/10 701/2 |
| 2012/0016547 A1* | 1/2012 | Aridome | B60K 6/365 701/22 |
| 2012/0086368 A1* | 4/2012 | Kawabuchi | B60L 3/0046 318/139 |
| 2012/0316713 A1* | 12/2012 | Pfefferl | F04C 18/16 701/22 |
| 2013/0204472 A1* | 8/2013 | Pfefferl | B60W 30/18127 701/22 |
| 2013/0268162 A1* | 10/2013 | Ponziani | B60W 30/00 701/48 |
| 2014/0067212 A1* | 3/2014 | Ueno | B60W 20/00 701/54 |
| 2014/0180518 A1* | 6/2014 | Hayashi | B60W 30/18127 701/22 |
| 2015/0066326 A1* | 3/2015 | Furuyama | B60T 7/042 701/70 |
| 2015/0151734 A1* | 6/2015 | Yamamoto | B60K 6/48 477/5 |
| 2015/0274019 A1 | 10/2015 | Matsuda | |
| 2016/0114786 A1* | 4/2016 | Morisaki | B60W 50/0097 701/22 |
| 2017/0297547 A1* | 10/2017 | Goto | B60T 7/12 |

* cited by examiner

FIG. 2
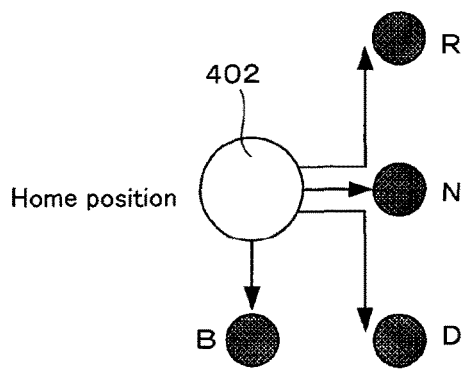
FIG. 3
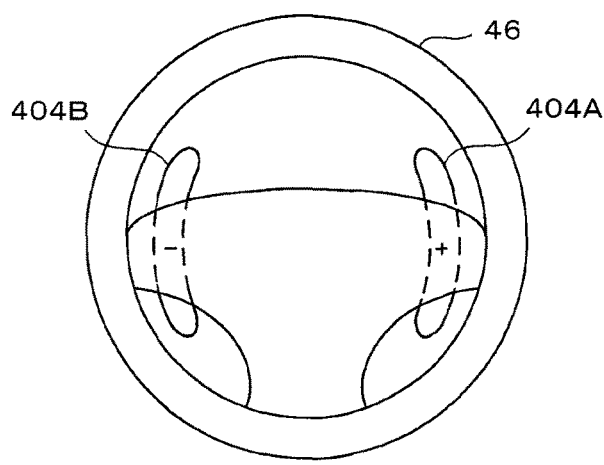
FIG. 4
| | | | | Default | | |
|---|---|---|---|---|---|---|
| 1st level-shift-pattern (by mode selector lever) | BL | | B | D | | |
| 2nd level-shift-pattern (by paddle switch pair) | BF | BE | BD | BC | BB | BA |
| Regeneration level | B5 | B4 | B3 | B2 | B1 | B0 |
| | Higher ←——————— Deceleration feeling ———————→ Lower | | | | | |

REGENERATIVE BRAKING CONTROL APPARATUS FOR ELECTRICALLY DRIVEN VEHICLE

TECHNICAL FIELD

The present invention relates to a regenerative braking control apparatus for an electrically driven vehicle having road wheels and an electric motor for driving the road wheels for running.

BACKGROUND OF THE INVENTION

From prior art, there have been known electrically driven vehicles having an electric motor, which is powered by electric energy charged in a battery in order to serve as a drive power source. Such electrically driven vehicles include so-called electric vehicles (EVs) having an electric motor as the only drive power source, as well as so-called hybrid electric vehicles (HEVs) having an electric motor and an internal combustion engine as the drive power sources.

Many electrically driven vehicles have a regenerative braking system, in which the electric motor is used as an electric generator, which is driven to provide braking force (regenerative braking force) so as to decelerate the vehicle, while the kinetic energy of the vehicle is converted into electric energy to achieve energy recovery. For higher energy efficiency, it is desirable to select a higher regenerative braking force, which results in more regenerative electric energy recovered. Too high a regenerative braking force, however, may result in too rapid deceleration of the vehicle, which may negatively affect on the drivability of the vehicle.

In order to address the problem, there is a technique well known in the art, in which an operation unit is provided for the driver to select a magnitude of the braking force to be generated during generative braking.

For example, Patent Document No. 1 listed below (Japanese Patent Publication No. 3,714,164) discloses a vehicle including an electric motor, a transmission with selectable gear positions of different gear ratios, and a drive shaft. These elements are connected with one another such that the torque of the electric motor is used for braking purpose. The vehicle further includes an operation unit for the driver of the vehicle to demand increase/decrease of the deceleration rate to be achieved during braking by the electric motor; means for calculating a desired deceleration rate by effecting increase/decrease adjustment to a predetermined initial default deceleration rate in accordance with the operation to the operation unit; means for selecting a desired gear position for achieving the desired deceleration rate by the torque of the electric motor; means for determining a desired operation condition of the electric motor for providing the drive shaft with braking force so as to achieve the desired deceleration rate; and a controller means for controlling the transmission to shift it into the desired gear ratio as well as for controlling the electric motor to operate it under the desired operation condition.

In addition, Patent Document No. 1 describes a failure detector for detecting any failure in the operation unit and resetting the desired deceleration rate when a failure in the operation unit is detected.

PRIOR ART DOCUMENT(S)

Patent Document(s)

Patent Document No. 1: Japanese Patent Publication No. 3,714,164

SUMMARY OF THE INVENTION

Problems to be Solved by the Invention

While with the vehicle disclosed in Patent Document No. 1, the braking force during regenerative braking is selectable by the driver, the selected braking force may not be always acceptable depending on the condition of the vehicle. For example, when state of charge of the battery of the electrically driven vehicle is near the full charge point, the electric energy generated by the regenerative braking (regenerative electric generation) is too much to be charged into the battery for recovery, so that the actual regenerative braking force cannot be as high as the selected regenerative braking force.

Automatic resetting of the selected regenerative braking force, which is selected through the control unit, would be one option for mitigating the problem. This option, however, may impart a strange feeling on the driver because the actual braking force is different than that is to be expected from the driver's selection.

The present invention has been achieved in view of the above. Accordingly, it is an object of the present invention to provide a regenerative braking control apparatus for an electrically driven vehicle, with which the regenerative braking force is selectable by the driver of the vehicle, allowing the driver to recognize whether or not the selected regenerative braking force is achievable.

Solution

In order to achieve the above-identified object, according to the first aspect of the invention, there is provided a regenerative braking control apparatus for an electrically driven vehicle having road wheels and an electric motor for driving the road wheels for running, comprising: an operation unit for a driver of the electrically driven vehicle to select a magnitude of the braking force to be generated by the electric motor during regenerative braking; a determination unit for determining, on the basis of conditions of the electrically driven vehicle, whether or not a selected braking force selected through the operation unit is acceptable; and a notifier unit, which is constructed such that, in a case where the selected braking force is determined to be unacceptable by the determination unit, the notifier unit provides a corresponding notification to the driver.

According to the second aspect of the invention, there is provided the regenerative braking force control apparatus, further comprising: a torque control unit for setting Output-Requested-Torque value for the electric motor to be a torque value smaller than the selected braking force in a case where the selected braking force is determined to be unacceptable by the determination unit, while setting Output-Requested-Torque value to be such a regenerative torque value that corresponds to the selected braking force in a case where the selected braking force is determined to be acceptable by the determination unit.

According to the third aspect of the invention, there is provided the regenerative braking force control apparatus, further comprising: a state of charge detector unit for detecting state of charge of a battery for storing electric energy to be used for driving the electric motor; wherein: the determination unit determines, on the basis of state of charge of the battery, whether or not the selected braking force is acceptable.

According to the fourth aspect of the invention, there is provided the regenerative braking force control apparatus, wherein: the determination unit determines that the selected braking force is unacceptable, in a case where an amount of electric energy to be generated during a predetermined time length of regenerative braking effected with the selected braking force is greater than maximum amount of electric energy additionally chargeable into the battery.

According to the fifth aspect of the invention, there is provided the regenerative braking force control apparatus, further comprising: a running condition detector unit for detecting running conditions of the electrically driven vehicle; and a braking force change unit for changing the regenerative braking force from the selected braking force into a smaller braking force when the electrically driven vehicle is under a predetermined running condition; wherein: the determination unit determines whether or not the selected braking force is acceptable, on the basis of whether or not the braking force change unit is functioning properly.

According to the sixth aspect of the invention, there is provided the regenerative braking force control apparatus, wherein: the braking force change unit determines grip limit of road surfaces on which the electrically driven vehicle is running, and the braking force change unit changes the regenerative braking force from the selected braking force into a smaller braking force when it is probable that vehicle speed of the electrically driven vehicle exceeds the currently selected braking force.

According to the seventh aspect of the invention, there is provided the regenerative braking force control apparatus, further comprising: a failure detector unit for detecting any failure in the running condition detector unit; wherein: the determination unit determines that the braking force change unit is not functioning properly, in a case where a failure in the running condition detector unit is detected by the failure detector unit.

According to the eighth aspect of the invention, there is provided the regenerative braking force control apparatus, further comprising: a sound output unit for outputting sound to the driver; wherein: the notifier unit causes the sound output unit to output a predetermined notification sound, when the selected braking force is determined to be unacceptable.

According to the ninth aspect of the invention, there is provided the regenerative braking force control apparatus, further comprising: a display unit for providing a visual indication for the driver indicating the selected braking force; wherein: the notifier unit causes the display unit to provide different visual indications between when the selected braking force is determined to be unacceptable and when the selected braking force is determined to be acceptable.

According to the tenth aspect of the invention, there is provided the regenerative braking force control apparatus, wherein: the determination unit determines, continually during running of the electrically driven vehicle, whether or not the selected braking force is acceptable; wherein: in a case where a change in conditions of the electrically driven vehicle occurs after a notification notifying that the selected braking force is unacceptable and due to that change the selected braking force is now determined to be acceptable, the notifier unit provides a corresponding notification.

Advantages Provided by the Invention

According to the first aspect of the invention, when a situation happens in which the selected braking force, i.e., the regenerative braking force selected by the driver, is determined to be unacceptable, the driver is notified of that situation. This enables the driver to recognize that the regenerative braking force to be actually generated may not be equal to the selected braking force, which may advantageously improve convenience for the driver. More specifically, by virtue of such notification, the driver can drive the vehicle with recognition that the regenerative braking force to be actually generated may be smaller than the selected braking force, so that he/she is induced to drive the vehicle while keeping in mind the necessities of relatively early braking and/or relatively wide distance from the preceding vehicle. In addition, by virtue of the above, the driver may be suggested to reselect the braking force so as to change the selected braking force into a lower one.

According to the second aspect of the invention, Output-Requested-Torque value for the electric motor is set to be a torque value smaller than the selected braking force in a case where the selected braking force is determined to be unacceptable. By virtue of this, the loads imposed on the electric motor and the associated peripheral devices may be reduced. Also, this may advantageously improve the travel stability of the electrically driven vehicle.

According to the third and fourth aspects of the invention, it is determined, on the basis of state of charge of the battery, whether or not the selected braking force is acceptable. By virtue of this, overcharge of the battery with the regenerative electric energy may be advantageously prevented.

According to the fifth and sixth aspects of the invention, it is determined whether or not the selected braking force is acceptable, on the basis of whether or not the braking force change unit is functioning properly. By virtue of this, locking up of the tires due to the regenerative braking may be advantageously avoided even when the vehicle is running under a predetermined inconvenient condition, such as when running on road surfaces having relatively low frictional resistance, and thereby advantageously improve the driving stability of the vehicle.

According to the seventh aspect of the invention, it is determined that the braking force change unit is not functioning properly, in a case where a failure in the running condition detector unit is detected. By virtue of this, it may be advantageously determined in a simple manner whether or not the braking force change unit is functioning properly.

According to the eighth aspect of the invention, the driver is notified of the determination that the selected braking force is unacceptable, by means of a notification sound. This may advantageously ensure that the driver receives such notification without being distracted from the maneuvering of the vehicle.

According to the ninth aspect of the invention, the notification is performed by a change in the visual indication provided by the display unit for indicating the selected braking force, so that the notification continues as long as the selected braking force is being determined to be unacceptable. This may advantageously enable the driver to easily notice the notification.

According to the tenth aspect of the invention, in a case where a change in conditions of the electrically driven vehicle occurs after a notification notifying that the selected braking force is unacceptable and due to that change the selected braking force is now determined to be acceptable, a corresponding notification is provided. This enables the driver to recognize that the driver's desired regenerative braking force is now available, which may advantageously improve convenience for the driver.

BRIEF DESCRIPTION OF THE DRAWINGS

FIG. 2 is a schematic illustration showing a mode selector lever 402 and the associated area as seen from above.

FIG. 3 is a schematic illustration showing a pair of paddle switches 404 and the associated area.

FIG. 4 is a conceptual diagram illustrating the regenerative braking force which is selectable through an operation unit 40.

EXEMPLARY MODE FOR CARRYING OUT THE INVENTION

With reference now to the accompanying drawings, a preferred embodiment of a regenerative braking control apparatus 10 according to the present invention will be described in detail.

Figure 1:
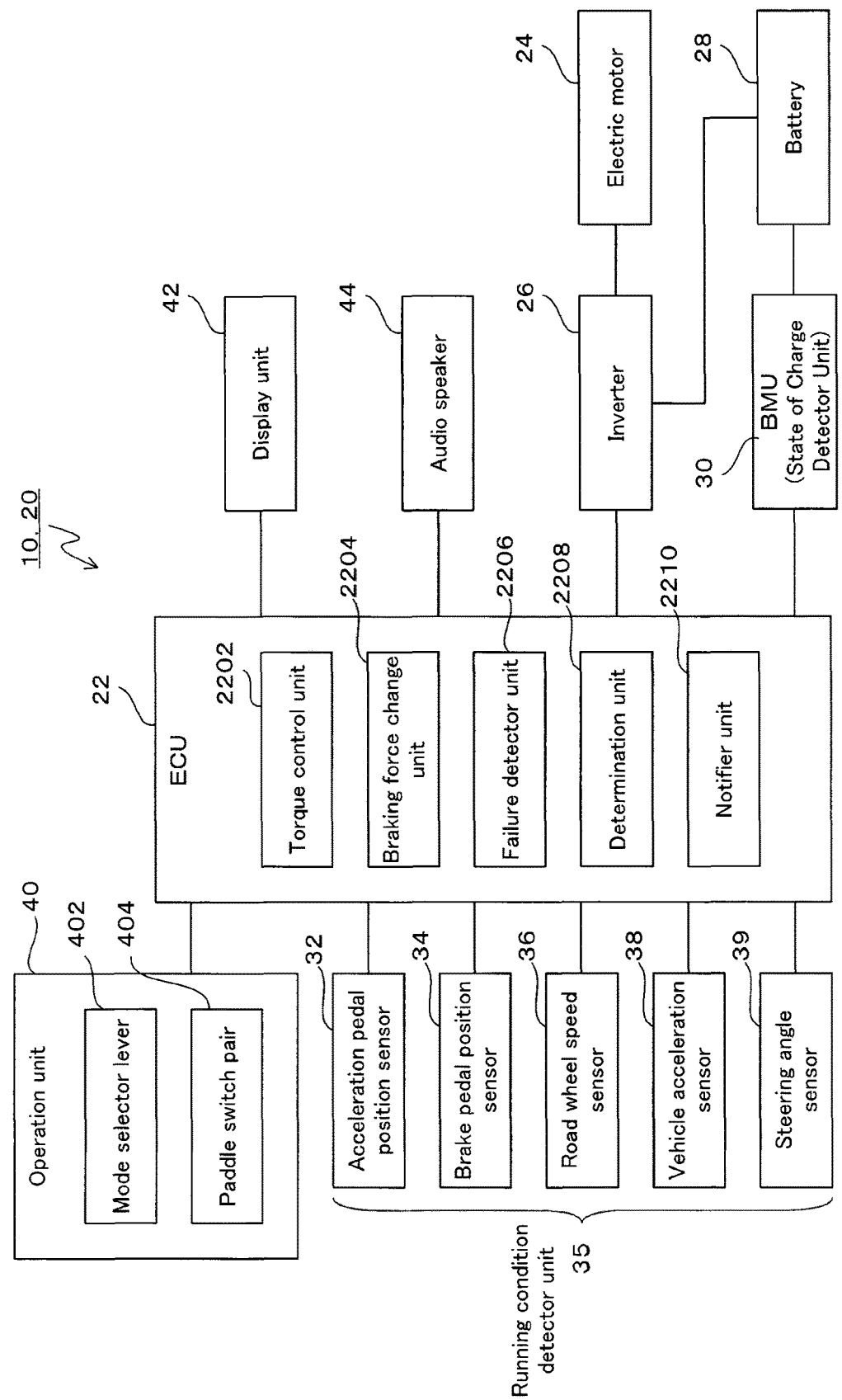
FIG. 1 is a schematic illustration showing a structure of a regenerative braking control apparatus 10 according to an embodiment of the present invention.

FIG. 1 is a schematic illustration showing a structure of a regenerative braking control apparatus 10 according to an embodiment of the present invention. With this embodiment, the regenerative braking control apparatus 10 is equipped on an electric vehicle (EV) having an electric motor 24 as the only drive power source of the vehicle.

The regenerative braking control apparatus 10 includes a vehicle electronic control unit (vehicle-ECU) 22, an electric motor 24 (serving as a drive motor generator), an inverter 26, a battery 28, a battery management unit (BMU) 30, an accelerator pedal position sensor 32, a brake pedal position sensor 34, a road wheel speed sensor 36, a vehicle acceleration sensor 38, a steering angle sensor 39, an operation unit 40 (including a mode selector lever 402 and a pair of paddle switches 404), a display unit 42 and an audio speaker 44.

The vehicle-ECU 22 is a microcomputer based unit including a central processing unit (CPU), a read only memory (ROM) for storing a control program and other data, a random access memory (RAM) configured to provide a working area for executing the control program, an electrically erasable and programmable read only memory (EE-PROM) for storing various data which may be subject to rewriting, and an interface unit for interfacing with peripherals. The vehicle-ECU 22 serves to control various operations performed in the whole of the electrically driven vehicle.

The electric motor 24 is powered by the electric energy supplied from the battery 28 to drive the road wheels (not shown) of the vehicle, as well as is capable of generating electricity during deceleration of the electrically driven vehicle. This means that the electric motor 24 serves both to drive the road wheels of the electrically driven vehicle and to perform the regenerative electricity generation.

More specifically, when a Drive-Request signal (which is produced depending on pressing down of the accelerator pedal by the driver) is detected through the accelerator pedal position sensor 32, the electric motor 24 is powered by the electric energy, which is supplied from the battery 28 and converted into AC current by the inverter 26, and outputs drive torque (or driving power for running) to be transmitted to the road wheels of the electrically driven vehicle.

Further, when the accelerator pedal is fully released by the driver, this is detected through the accelerator pedal position sensor 32, and the electric motor 24 is caused to operate as a generator for the electric power generation. That is, the electric motor 24 receives torque from the road wheels to perform regenerative power generation, when reactive torque of the electric motor 24 is transmitted onto the road wheels and used as braking force (the "regenerative braking force") for the vehicle. The electric energy generated by the regenerative electricity generation is converted into DC current by the invertor 26 and charged into the battery 28.

The level of the regenerative braking force is selectable by the driver through the operation unit 40, as described later in more detail.

The battery 28 is connected with the electric motor 24 through the invertor 26 and supplies/receives electric energy to/from the electric motor 24.

The battery 28 supplies electric energy as the driving power to the electric motor 24 through the invertor 26. The battery 28 stores regenerative electric energy to be generated by the electric motor 24 during regenerative braking. In addition, the battery 28 is chargeable also by means of an external charger (not shown).

The battery management unit (BMU) 30 detects conditions of the battery 28 and outputs corresponding condition signals to the vehicle-ECU 22.

The BMU 30 includes detector circuits for detecting the cell current and the cell voltage of the battery 28, a state of charge (SOC) detector circuits for detecting SOC of the battery 28, and a temperature sensor for detecting the cell temperature of the battery 28. The BMU 30 represents an embodiment of the "state of charge detector unit" recited in the claims.

The accelerator pedal position sensor 32 detects the current position of the accelerator pedal (not shown) of the electrically driven vehicle.

The brake pedal position sensor 34 detects the current position of the brake pedal (not shown) of the electrically driven vehicle.

The road wheel speed sensor 36 detects the rotational speed of each road wheel of the electrically driven vehicle and outputs pulse signals indicating the vehicle speed.

The vehicle acceleration sensor 38 detects the acceleration rate of the vehicle.

The steering angle sensor 39 detects the rotational angle of the steering wheel 46 (see FIG. 3).

The above-mentioned sensors serve to function as parts of a running condition detector unit 35 for detecting running conditions of the electrically driven vehicle. The information about the running conditions of the electrically driven vehicle as detected by the running condition detector unit 35 is outputted to the vehicle-ECU 22.

The operation unit 40 is provided for the driver of the electrically driven vehicle 30 to select a magnitude of the braking force to be generated by the electric motor 24 during regenerative braking. The selected magnitude of the regenerative braking force as selected by the driver through the operation unit 40 will be referred to as the "selected braking force" hereinafter.

With this embodiment, the operation unit 40 includes a mode selector lever 402 and a pair of paddle switches 404. By operating the mode selector lever 402, the regenerative braking force of the electrically driven vehicle may be changed only in up-level direction from the initial, default braking force. By operating the pair of paddle switches 404, the regenerative braking force of the electrically driven vehicle may be changed both in up-level and down-level directions among a plurality of predefined levels.

FIG. 2 is a schematic illustration showing the mode selector lever 402 situated nearby a driver's sheet and the associated area as seen from above.

The mode selector lever 402 is operated by the driver to change the driving mode of the vehicle and is situated nearby the driver's seat.

The mode selector lever 402 is normally at a home position as shown FIG. 2. For operation, the driver may move the mode selector lever 402 in fore and aft direction and in right and left direction so as to change its position from the home position into a different position, by which the running mode is changed to the corresponding mode.

The mode selector lever 402 has N-position corresponding to neutral mode in which no power is transmitted between the electric motor 24 and the road wheels, D-position corresponding to ordinary driving mode in which the vehicle runs ahead, and R-position corresponding to reverse mode in which the vehicle runs rearward.

The mode selector lever 402 further has B-position. When D-position is selected so that the vehicle is in ordinary running mode, the driver may operate the mode selector lever 402 to move it into B-position, which causes the level of the regenerative braking force to be shifted up into a higher level. The mode selector lever 402 is capable of self-returning to the home position after being operated into any other position and subsequently released by the driver. Thus, when the driver releases the mode selector lever 402 after operating it into B-position, it automatically returns from B-position to the home position. The level of the regenerative braking force is shifted up by operation of the mode selector lever 402 into B-position.

FIG. 3 is a schematic illustration showing a pair of paddle switches 404 mounted on the steering wheel 46 and the associated area.

The pair of paddle switches 404 includes an up-level-shifting paddle switch 404A for shifting up the level of the regenerative braking force from one level to the next higher level, and a down-level-shifting paddle switch 404B for shifting down it from one level to the next lower level. The driver operates either paddle switch by pulling the paddle lever of the paddle switch toward his body (rearward with respect the vehicle) while gripping the steering wheel 46.

FIG. 4 is a conceptual diagram illustrating the regenerative braking force which is selectable through the mode selector lever 402 and the paddle switch pair 404.

In relation to the regenerative braking force of the electric motor 24, there are predefined six different regeneration levels B0, B1, B2, B3, B4 and B5 indicating magnitude of the braking force, and the regeneration levels have corresponding level-select-positions associated with them.

Some of the level-select-positions are selectable by operation of the mode selector lever 402 and arranged in a first level-shift-pattern. The other level-select-positions are selectable by operation of the paddle switch pair 404 and arranged in a second level-shift-pattern. The six regeneration levels B0-B5 are predefined such that the regenerative braking force generated with B0-regeneration-level is the lowest, and those generated at B1-, B2-, B3-, B4- and B5-regeneration-levels are higher in this order. The higher the regenerative force, the stronger deceleration feeling the driver feels and the more regenerative electric energy is generated (thus, the greater regenerative torque is produced) during regenerative braking.

Among the six regeneration levels B0-B5, B2-regeneration-level is default, that is, B2-regeneration-level is selected by the apparatus in the initial state. In addition, when the mode selector lever 402 is operated into D-position, as well as when the paddle switch pair 404 is operated to select BC-level-select-position, B2-regeneration-level is selected.

The first level-shift-pattern has three level-select-positions D, B and BL, which are selectable by operation of the mode selector lever 402. More specifically, D-level-select-position is selectable by operating the mode selector lever 402 into D-position. D-level-select-position corresponds to B2-regeneration-level, which is the default regeneration level as described above. Following the operation of the mode selector lever 402 into D-position, by operating the mode selector lever 402 once into B-position, transition occurs from D-level-select-position into B-level-select-position, which corresponds to B3-regeneration-level, so that B-level-select-position provides higher regenerative braking force than D-level-select-position. Thereafter, by operating the mode selector lever 402 once again into B-position, transition occurs into BL-level-select-position, which corresponds to B5-regeneration-level, so that BL-level-select-position provides higher regenerative braking force than B-level-select-position. Thereafter, by operating the mode selector lever 402 once again into B-position, transition occurs into D-level-select-position.

The mode selector lever 402 has fewer level-select-positions than the paddle switch pair 404, so that the number of operations of the mode selector lever 402 required for selecting a desired regeneration level may be often smaller than the number of operations of the paddle switch pair 404 required for selecting the same regeneration level. This means that the number of operations of the mode selector lever 402 required for obtaining a desired regenerative electricity energy may be often smaller than the number of operations of the paddle switch pair 404 required for obtaining the same regenerative electricity energy, so that the driver may handily control (or increase/decrease) the regenerative braking force with relatively fewer operations of the mode selector lever 402, which is advantageous for mitigating driver's burden for the control operation.

The second level-shift-pattern has six level-select-positions BA, BB, BC, BD, BE and BF, which are selectable by operation of the paddle switch pair 404. The second level-shift-pattern has more level-select-positions than the first level-shift-pattern.

BA-, BB-, BC-, BD-, BE- and BF-level-select-positions correspond to B0-, B1-, B2-, B3-, B4-, and B5-regeneration-levels, respectively. By operating either the up-level-shifting paddle switch 404A or the down-level-shifting paddle switch 404B required number of times, desired transitions may be caused among the level-select-position, and thus among the regeneration-level.

The paddle switch pair 404 has more level-select-positions than the mode selector lever 402, so that the number of operations of the paddle switch pair 404 required for selecting a desired regeneration level may be often greater than the number of operations of the mode selector lever 402 required for selecting the same regeneration level. Thus, the use of the paddle switch pair 404 is suitable for delicate control of the regenerative braking force.

As understood from the above, the apparatus includes two different operation tools, the mode selector lever 402 and the paddle switch pair 404, and the number of operations required for selecting a desired regeneration level is different between them. By virtue of this, the apparatus may advantageously enable the driver to control the regenerative braking force, taking into consideration running situations of the vehicle and as he/she desires. In particular, the number of operations of the mode selector lever 402 required for obtaining a desired regenerative electricity energy may be often smaller than the number of operations of the paddle switch pair 404 required for obtaining the same regenerative electricity energy, so that the driver may handily control (or increase/decrease) the regenerative braking force with relatively fewer operations of the mode selector lever 402, which is advantageous for mitigating driver's burden for the control operation. On the other hand, the required number of operations of the paddle switch pair 404 may be often greater than that of the mode selector lever 402, so that the use of the paddle switch pair 404 is suitable for delicate control of the regenerative braking force.

Referring now back to FIG. 1, the display unit 42 is situated on the dashboard in front of the driver's seat. The display unit 42 provides visual indications for the driver indicating various selections and configurations of the electrically driven vehicle.

With this embodiment, in particular, the display unit 42 provides a visual indication for the driver indicating the selected braking force. As described above, the selection of the regenerative braking force is performed through the operation unit 40, in which such one of the level-select-positions that corresponds to a desired regeneration level is selected, and the display unit 42 indicates the selected regeneration level thus selected.

The audio speaker 44 outputs sounds within the interior of the vehicle (and thus to the driver).

The vehicle-ECU 22 includes a torque control unit 2202, a braking force change unit 2204, a failure detector unit 2206, a determination unit 2208 and a notifier unit 2210, all of which are implemented by a software program (the control program mentioned above) executed by the CPU mentioned above.

The torque control unit 2202 sets Output-Requested-Torque value for the electric motor 24 based on the selected braking force, and controls the inverter 26.

More specifically, in a case where the selected braking force is determined to be acceptable, the torque control unit 2202 sets Output-Requested-Torque value to be such a regenerative torque value that corresponds to the selected braking force (regeneration level) which is selected through the operation unit 40, and controls the inverter 26. On the other hand, in a case where the selected braking force (regeneration level) is determined to be unacceptable by the determination unit 2208, as described later in more detail, the torque control unit 2202 sets Output-Requested-Torque value to be a torque value smaller than the selected braking force, which is a regenerative torque value that corresponds to an acceptable regeneration level, and controls the inverter 26.

In addition, in a case where the generative braking force is changed from the selected braking force into a smaller regenerative braking force by the braking force change unit 2204, as described later, the torque control unit 2202 sets Output-Requested-Torque value to be such a regenerative torque value that corresponds to thus changed regenerative braking force, and controls the inverter 26.

The braking force change unit 2204 changes the regenerative braking force from the selected baking force into a smaller braking force when the electrically driven vehicle is under a predetermined running condition.

The predetermined running condition may be, for example, such a condition in which the electrically driven vehicle is running on road surfaces having relatively low frictional resistance (low p road surfaces).

For example, Output-Requested-Torque value to be set when the regenerative braking force is selected at B5-regeneration-level may be several times greater than that to be set when the regenerative braking force is selected at B2-regeneration-level. If the frictional resistance of road surfaces is being lowered due to rain or snow and the tire performance is not good enough, then too high a selected regenerative braking force may cause locking up of the tires and/or unstable behavior of the vehicle.

The braking force change unit 2204 is one of functionalities of an antilock brake system (ABS), which is a well-known system for preventing locking up of the tires. The braking force change unit 2204 determines probability of locking up of the tires, on the basis of difference between the output of the wheel speed sensor 36 and the vehicle speed, and changes the regenerative braking force from the selected braking force into a smaller braking force.

Figure 5:
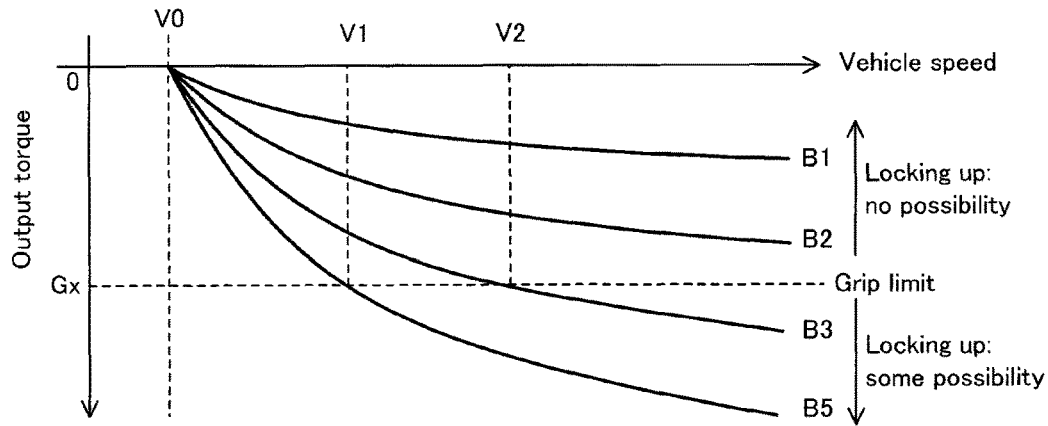
FIG. 5 is a diagram schematically illustrating a process performed in a braking force change unit 2204.

FIG. 5 is a diagram schematically illustrating the process performed in the braking force change unit 2204.

In the map of FIG. 5, the vertical axis represents the output torque values of the electric motor 24, which values are negative because they are values of the torque to be generated during regenerative braking (i.e., values of the regenerative torque). The horizontal axis represents vehicle speeds.

As apparent from FIG. 5, the higher the regeneration level, as well as the higher the vehicle speed, the greater the value of the generated regenerative toque is.

Here, it is assumed that grip limit of road surfaces is reached with regenerative torque Gx. If B5-regeneration-level is selected, the probability of locking up of the tires jumps up when the vehicle speed exceeds V1, while, if B3-generation-level is selected, that probability jumps up when the vehicle speed exceeds V2.

The braking force change unit 2204 determines the magnitude of grip limit (which is one of road surface conditions), on the basis of running conditions of the electrically driven vehicle as detected by the running condition detector unit 35. If it is probable that grip limit is reached at the current vehicle speed and with current selected braking force (regeneration level), then the braking force change unit 2204 changes the regenerative braking force from the selected braking force into a smaller braking force. For example, with the embodiment shown in FIG. 5, if the selected braking force is B5-regeneration-level and the vehicle speed is exceeding V1, the regenerative braking force is changed into B3-regeneration-level in order to prevent reaching grip limit, which is reached with regenerative torque Gx. Further, when the vehicle speed further increases to be exceeding V2, the regenerative braking force is again changed into B2-regeneration-level.

In this manner, the braking force change unit 2204 prevents locking up of the tires and ensures stable running of the vehicle.

Referring back to FIG. 1, the failure detector unit 2206 detects any failure in the running condition detector unit 35 (including the above described sensors) for detecting running conditions of the electrically driven vehicle.

The failure detector unit 2206 detects a failure in the running condition detector unit 35 by, for example, checking whether or not the levels of various detection signals from the running condition detector unit 35 are within respective normal ranges.

With the embodiment shown in the drawings, the failure detector unit 2206 also detects any failure in the operation unit 40.

The determination unit 2208 determines, on the basis of conditions of the electrically driven vehicle, whether or not the magnitude of the braking force selected through the operation unit 40 (i.e., the selected braking force) is acceptable.

As an example, the determination unit 2208 determines, on the basis of state of charge of the battery 28 detected by the BMU 30, whether or not the selected braking force is acceptable.

More specifically, during regenerative braking, the regenerative electricity generation occurs, and the electric energy thus generated is charged into the battery 28. The amount of the electric energy to be generated by the regenerative electricity generation is proportional to the magnitude of the regenerative braking force. Therefore, in a case where the selected regenerative braking force is relatively high while state of charge of the battery 28 is near the full charge point, there is a risk of overcharge of the battery 28. In order to avoid the risk of overcharge, the magnitude of the regenerative braking force should be kept small enough to ensure that such an amount of electric energy that is to be generated during a period of regenerative braking is smaller than maximum amount of electric energy additionally chargeable into the battery 28. Accordingly, the determination unit 2208 determines that the selected braking force is unacceptable, in a case where such an amount of electric energy that is to be generated during a predetermined time length of regenerative braking with the selected braking force is greater than maximum amount of electric energy additionally chargeable into the battery 28.

The determination unit 2208 estimates, on the basis of state of charge of the battery 28, maximum amount of electric energy additionally chargeable into the battery 28. Also, the determination unit 2208 determines any acceptable regeneration level(s). This determination is performed, for example, by looking up a map of standard values of the amount of electric energy to be generated by the regenerative electricity generation, indicated for each regeneration level, such as schematically shown in FIG. 6.

Figure 6:
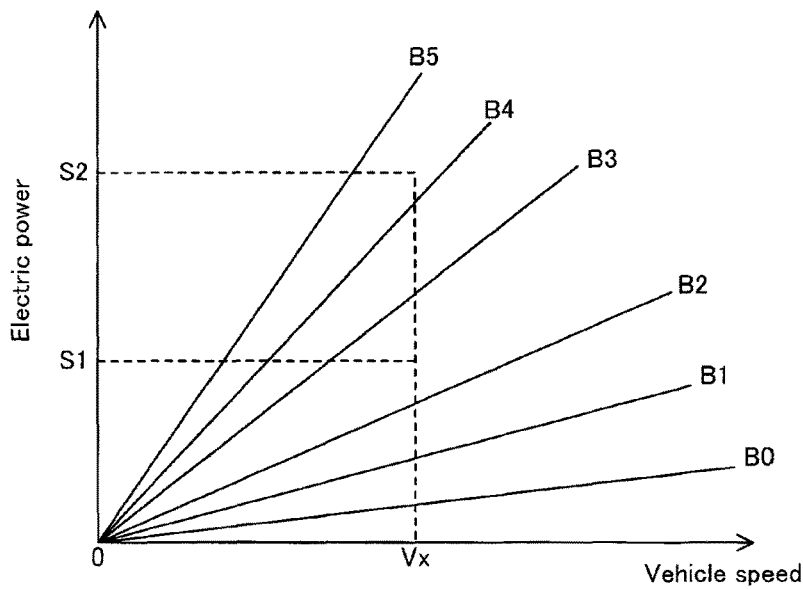
FIG. 6 is a diagram schematically illustrating a process performed in a determination unit 2208.

In the map of FIG. 6, the vertical axis represents amounts of electric energy to be generated during a unit time length of regenerative braking and the horizontal axis represents the vehicle speeds.

As apparent from FIG. 6, the higher the regeneration level (and thus the greater the regenerative braking force), as well as the higher the vehicle speed, the greater the amount of electric energy is to be generated by regenerative electricity generation.

As an example, consider a situation where maximum amount of electric energy additionally chargeable into the battery 28 is S1 and the vehicle speed is Vx. In this situation, if the selected braking force is at B5-, B4- or B3-regeneration-level, then the amount of electric energy generated during regenerative braking would exceed maximum amount of electric energy additionally chargeable into the battery 28. Accordingly, acceptable regeneration levels are B2-, B1- and B0-regeneration-levels.

As another example, consider another situation where maximum amount of electric energy additionally chargeable into the battery 28 is S2 (>S1) and the vehicle speed is Vx. In such situation, B4-, B3-, B2-, B1- and B0-regeneration-levels are acceptable, while only B5-regeneration-level is unacceptable.

Alternatively, the determination unit 2208 may be so constructed as to determine whether or not the selected braking force is acceptable, not on the basis of an actual vehicle speed but on the basis of a predetermined reference vehicle speed.

In such an alternative embodiment, the determination unit 2208 estimates, for each of the regeneration levels, the amount of regenerative electric energy which is expected to be generated during regenerative braking at the predetermined reference vehicle speed. If the estimated amount of electric energy for a certain regeneration level is smaller than maximum amount of electric energy additionally chargeable into the battery 28, then that regeneration level is determined to be acceptable. On the other hand, if the estimated amount of electric energy for a certain regeneration level is greater than maximum amount of electric energy additionally chargeable into the battery 28, then that regeneration level is determined to be unacceptable.

Since the vehicle speed is changing continually during running of the vehicle, a relatively heavy process load is required in order to continuously monitor the actual vehicle speed and determine acceptability of regeneration levels taking into consideration the actual vehicle speed. Thus, the use of the predetermined reference vehicle speed in place of the actual vehicle speed in order to determine acceptability of regeneration levels may be helpful for mitigating the process load of the determination unit 2208.

In addition, the determination unit 2208 determines whether or not the selected braking force is acceptable, on the basis of whether or not the braking force change unit 2204 is functioning properly.

In a case where a failure in the running condition detector unit 35 is detected by the failure detector unit 2206, the determination unit 2208 determines that the braking force change unit 2204 is not functioning properly. This determination has significance because any failure in the running condition detector 35 may possibly result inconvenient situations, in which the braking force change unit 2204 can no longer change the braking force at all or no longer do it with sufficient preciseness, so that the vehicle may possibly lose driving stability due to an inappropriate braking force selection.

In a case where a failure in the running condition detector unit 35 is detected, the determination unit 2208 determines, for each regeneration level, whether or not it is possible that the output torque of the electric motor 24 exceeds grip limit of the electrically driven vehicle at any vehicle speed. If, for a certain regeneration level, it is determined that the output torque of the electric motor 24 does not exceed grip limit of the electrically driven vehicle at any vehicle speed, then the determination unit 2208 determines that the selected braking force at such generative level is acceptable. For example, with the embodiment shown in FIG. 5, the output torque of the electric motor 24 does not exceed grip limit Gx of the electrically driven vehicle for any of B2-, B1- and B0-regeneration-levels. Accordingly, the determination unit 2208 determines that the selected braking forces at these generative levels are acceptable. On the other hand, if the selected braking force is selected to be at B5-regeneration-level, the determination unit 2208 determines the selected braking force is unacceptable.

The determination unit 2208 determines, not only after the operation unit 40 is operated (which means that the selected braking force is changed) but also repetitively during running of the electrically driven vehicle, whether or not the selected braking force is acceptable. Thus, there may happen a situation in which a change in conditions of the electrically driven vehicle occurs after a notification notifying that the selected braking force is unacceptable and due to that change the selected braking force is now determined to be acceptable. For example, such a "change in conditions of the electrically driven vehicle" may be a decrease in state of charge of the battery 28 and the corresponding increase in maximum amount of electric energy additionally chargeable into the battery 28, which may occur during continuous running of the electrically driven vehicle.

The notifier unit 2210 is constructed such that, in a case where the selected braking force is determined to be unacceptable by the determination unit 2208, the notifier unit 2210 provides a corresponding notification to the driver.

The notifier unit 2210 causes the audio speaker 44 (sound output unit) to output a predetermined notification sound, when the selected braking force is determined to be unacceptable. The notification sound may be, for example, an alarm sound such as a beep, a voice message "it is possible that the deceleration rate may be lower than your selection" notifying the possibility of an insufficient braking force, a voice message "please reselect the regeneration level to change it into a lower level" suggesting the driver to make such reselect operation, and so on.

Further, the notifier unit 2210 causes the display unit 44 to provide different visual indications between when the selected braking force is determined to be unacceptable and when the selected braking force is determined to be acceptable.

Figure 7:
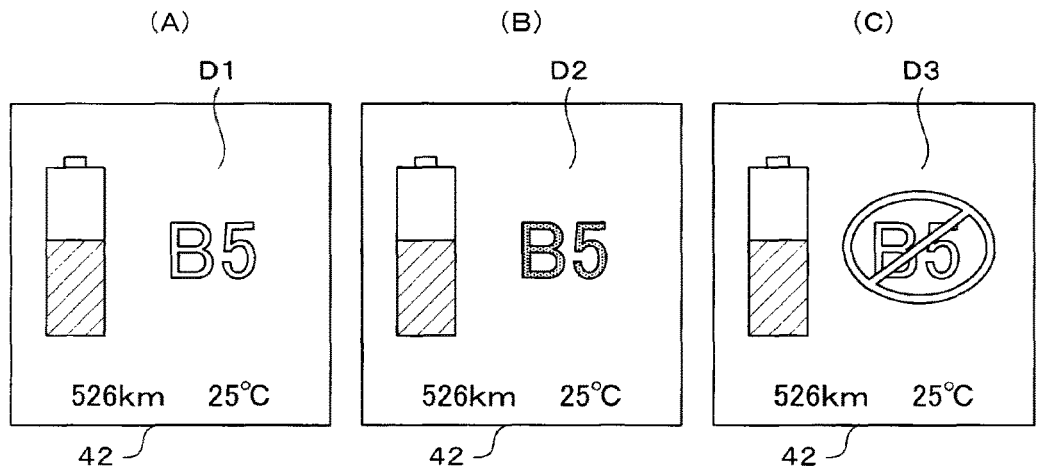
FIGS. 7A-7C are illustrations showing exemplified visual indications provided by a display unit 42 for indicating a selected braking force.

FIGS. 7A-7C are illustrations showing exemplified visual indications provided on the screen of the display unit 42 for indicating the selected braking force. The visual indications include an icon (referenced by D1, D2 and D3, respectively) for indicating the selected braking force, together with an icon for indicating state of charge of the battery 28, a figure of distance-to-empty, and a figure of ambient temperature. Although the real background color of the dashboard is usually black, FIGS. 7A-7C show the background color in white for illustration purpose.

FIG. 7A shows an example of the visual indication to be provided when the selected braking force is determined to be acceptable. The icon D2 is colored in a "normal" color, say, green, white, etc.

FIG. 7B shows an example of the visual indication to be provided when the selected braking force is determined to be unacceptable. The icon D2 is colored in such a color that is other than white and suggestive of a failure, say, red, orange, etc.

FIG. 7C shows another example of the visual indication to be provided when the selected braking force is determined to be unacceptable. The icon D3 is a combination of a character "B3" indicating the selected regeneration level and an overlaid mark resembling an inhibiting sign.

It would be very effective if such visual indications are provided along with the associated notification sounds provided by the audio speaker 44 as described above.

In a case where a change in conditions of the electrically driven vehicle occurs after a notification notifying that the selected braking force is unacceptable and due to that change the selected braking force is now determined to be acceptable by the determination unit 2208, the notifier unit 2210 provides a corresponding notification.

This is notified in the same manner as described above, that is, by means of notification sound from the audio speaker 44 and visual indication provided by the display unit 42.

As described above, when the selected braking force is determined to be an unacceptable, the torque control unit 2202 sets Output-Requested-Torque value to be a torque value smaller than the selected braking force. If a change in conditions of the electrically driven vehicle occurs thereafter and due to that change the selected braking force is now determined to be acceptable by the determination unit 2208, then the torque control unit 2202 changes Output-Requested-Torque value from that smaller torque value into such a torque value that corresponds to the selected braking force. In this relation, it would be preferable that such change of Output-Requested-Torque is performed only after the driver is notified of the possible change of the regenerative braking force by the notifier unit 2210 and the driver provides his/her consent to the change by operating the operation unit 40.

Figure 8:
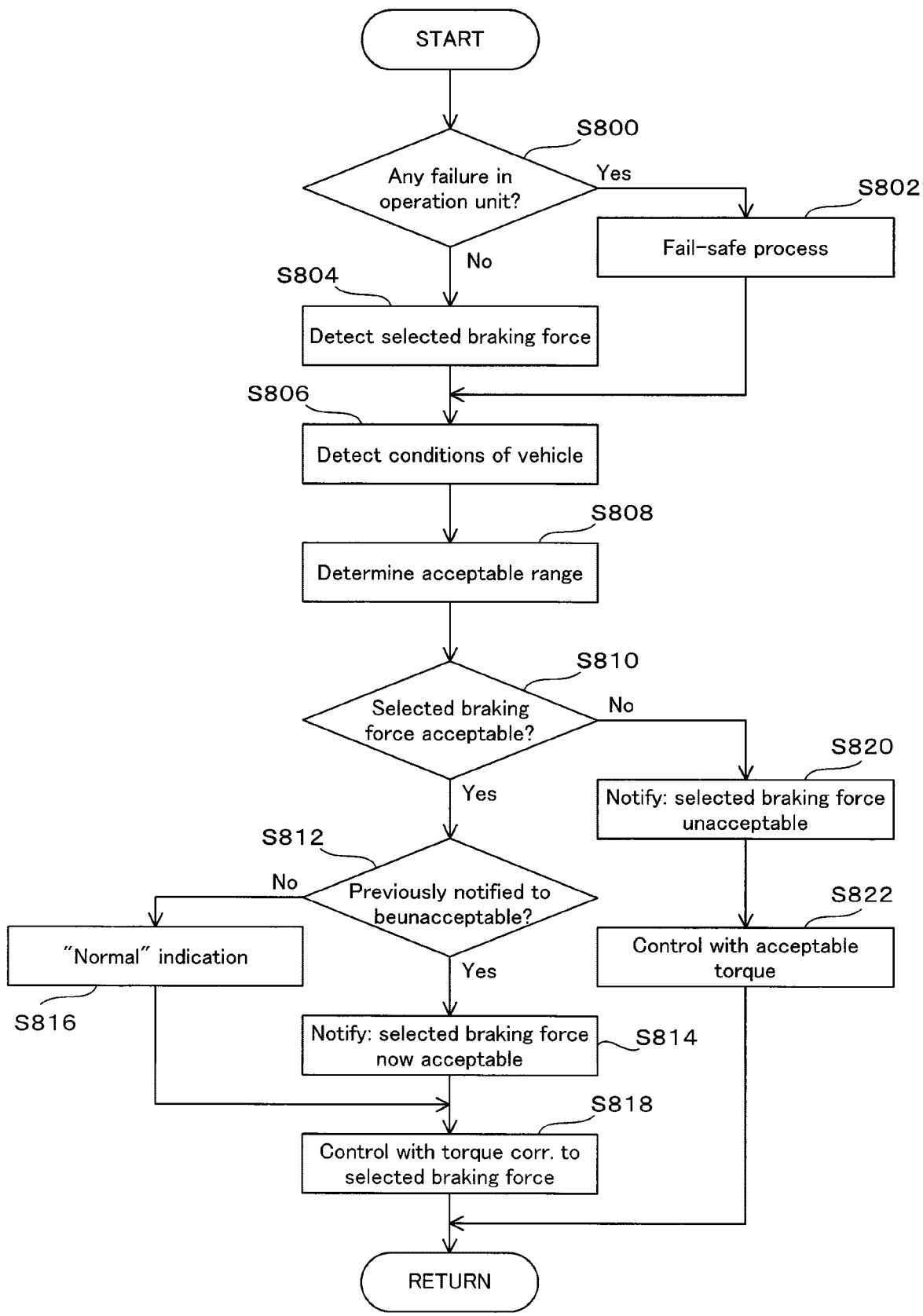
FIG. 8 is a flowchart showing processes performed in a regenerative braking control apparatus 10.

FIG. 8 is a flowchart showing processes performed in the regenerative braking control apparatus 10.

In the regenerative braking control apparatus, at first, the failure detector unit 2206 determines whether or not there is any failure in the operation unit 40 (Step S800).

If there is a failure in the operation unit 40 (Yes branch from Step S800), it means that there is a risk of inaccurate detection of the driver's operation, so that the regenerative braking control apparatus 10 performs a fail-safe process (Step S802). In a case where the failure is a malfunction of the mode selector lever 402, then the select position of the mode selector lever 402 is set to neutral position (N-position) in the fail-safe process. If the failure is a malfunction of the paddle switch pair 404, then any operation of the paddle switch pair 404 is made ignorable in the fail-safe process.

On the other hand, if there is no failure in the operation unit 40 (No branch from step S800), the status of the operation unit 40 is detected so as to detect the selected braking force (Step S804).

Next, the determination unit 2208 retrieves information about conditions of the vehicle, which has been gathered by the running condition detector unit 35 and the BMU 30 (Step S806), and determines an acceptable range of regenerative braking force (regeneration level) (Step S808).

If the selected braking force is within the acceptable range (Yes branch from Step S810), then it is determined whether or not there has been a previous notification notifying that the same selected braking force is unacceptable. In other words, it is determined whether or not a change in conditions of the electrically driven vehicle has occurred and the selected braking force has become acceptable due to that change (Step S812).

If the selected braking force has been notified to be unacceptable in such previous notification (Yes branch from step S812), then it is notified that the selected braking force has now become acceptable (Step S814).

On the other hand, if the selected braking force has not been so notified (No branch from step S812), then a "normal" visual indication is provided on the screen of the display unit 42 and no notification sound is outputted from the audio speaker 44 (Step S816).

Then, the torque control unit 2202 sets Output-Requested-Torque value to be such a torque value that corresponds to the selected braking force, and controls the inverter 26 (Step S818).

Referring back to Step S810, if the selected braking force is not within the acceptable range (No branch from Step S810), then it is notified that the selected braking force is unacceptable (Step S820).

If the driver responds to this notification by reselecting the braking force, then the process flow loops back to Step S804 and repeats the above described processes.

Otherwise, the torque control unit 2202 sets Output-Requested-Torque value to be a torque value which is in accord with an acceptable range of regenerative braking force (regeneration level), and controls the inverter 26 (Step S822).

According to the process flow shown by the flowchart of FIG. 8, the determination of an acceptable range of regenerative braking force (regeneration level) (Step S808) is performed after the detection of the selected braking force (Step S804). Alternatively, the determination of an acceptable range of regenerative braking force may be continually repeated irrespective of the detection of the selected braking force.

Further, in this relation, it would be advantageous to provide the apparatus with an operation restriction unit for restricting the function of the operation unit 40, such that it prevents any operation to the operation unit 40 which otherwise could be done in an attempt to select such magnitude of braking force that has been determined to be unacceptable by the determination unit 2208.

For example, such an operation restriction unit may include a restriction mechanism for preventing the movement of the mode selector lever 402 into B-position and/or a lock mechanism for locking the paddle lever of the up-level-shifting paddle switch 404A at its normal position (non-active position). Any operation to the operation unit 40 which may be tried in an attempt to select such regeneration level that has been determined to be unacceptable by the determination unit 2208 may be effectively prevented by means of such mechanisms.

As apparent from the above, according to the regenerative braking control apparatus 10 shown and described as an embodiment of the present invention, when a situation happens in which the selected braking force, i.e., the regenerative braking force selected by the driver, is determined to be unacceptable, the driver is notified of that situation. This enables the driver to recognize that the regenerative braking force to be actually generated may not be equal to the selected braking force, which may advantageously improve convenience for the driver.

More specifically, by virtue of such notification, the driver can drive the vehicle with recognition that the regenerative braking force to be actually generated may be smaller than the selected braking force, so that he/she is induced to drive the vehicle while keeping in mind the necessities of relatively early braking and/or relatively wide distance from the preceding vehicle. In addition, by virtue of the above, the driver may be suggested to reselect the braking force so as to change the selected braking force into a lower one.

According to the regenerative braking control apparatus 10, it is determined, on the basis of state of charge of the battery 28, whether or not the selected braking force is acceptable. By virtue of this, overcharge of the battery 28 with the regenerative electric energy may be advantageously prevented.

According to the regenerative braking control apparatus 10, it is determined whether or not the selected braking force is acceptable, on the basis of whether or not the braking force change unit 2204 is functioning properly. By virtue of this, locking up of the tires due to the regenerative braking may be advantageously avoided even when the vehicle is running under a predetermined inconvenient condition, such as when running on road surfaces having relatively low frictional resistance, and thereby advantageously improve the driving stability of the vehicle.

According to the regenerative braking control apparatus 10, it is determined that the braking force change unit 2204 is not functioning properly, in a case where a failure in the running condition detector unit 35 is detected. By virtue of this, it may be advantageously determined in a simple manner whether or not the braking force change unit 2204 is functioning properly.

According to the regenerative braking control apparatus 10, the driver is notified of the determination that the selected braking force is unacceptable, by means of a notification sound. This may advantageously ensure that the driver receives such notification without being distracted from the maneuvering of the vehicle.

According to the regenerative braking control apparatus 10, the notification is performed by a change in the visual indication provided by the display unit 42 for indicating the selected braking force, so that the notification continues as long as the selected braking force is being determined to be unacceptable. This may advantageously enable the driver to easily notice the notification.

Finally, according to the regenerative braking control apparatus 10, in a case where a change in conditions of the electrically driven vehicle occurs after a notification notifying that the selected braking force is unacceptable and due to that change the selected braking force is now determined to be acceptable, a corresponding notification is provided. This enables the driver to recognize that the driver's desired regenerative braking force is now available, which may advantageously improve convenience for the driver.

LIST OF REFERENCE NUMERALS

10 Regenerative braking control apparatus
20 Electrically driven vehicle
22 Vehicle-ECU
2202 Torque control unit
2204 Braking force change unit
2206 Failure detector unit
2208 Determination unit
2210 Notifier unit
24 Electric motor
26 Inverter
28 Battery
30 Electrically driven vehicle
32 Acceleration pedal position sensor
34 Brake pedal position sensor
35 Running condition detector unit
36 Road wheel speed sensor
38 Vehicle acceleration sensor
39 Steering angle sensor
40 Operation unit
402 Mode selector lever
404 Paddle switch pair
42 Display unit
44 Audio speaker
46 Steering wheel

What is claimed is:

1. A regenerative braking control apparatus for an electrically driven vehicle having road wheels and an electric motor for driving the road wheels for running, comprising:
   a state of charge detector detecting a state of charge of a battery that stores electric energy to be used for driving the electric motor;
   an operation unit allowing a driver of the electrically driven vehicle to select a regeneration level indicating magnitude of braking force to be generated by the electric motor during regenerative braking;
   a controller configured to:

determine, on the basis of the detected state of charge of the battery, whether or not regeneration at the regeneration level selected through the operation unit is acceptable; and a notifier that provides the driver, in a case where the regeneration level is determined to be unacceptable in the determining step, a corresponding notification together with an indication of the regeneration level.

2. The regenerative braking control apparatus according to claim 1, wherein
the controller is being further configured to:
set an Output-Requested-Torque value for the electric motor to be a torque value smaller than the regeneration level in a case where the regeneration level is determined to be unacceptable by the determination unit, while setting Output-Requested-Torque value to be such a regenerative torque value that corresponds to the regeneration level in a case where the regeneration level is determined to be acceptable by the determination unit.

3. The regenerative braking control apparatus according to claim 1, wherein:
the controller is further configured to:
determine that the regeneration level is unacceptable, in a case where an amount of electric energy to be generated during a predetermined time length of regenerative braking effected with the regeneration level is greater than maximum amount of electric energy additionally chargeable into the battery.

4. The regenerative braking control apparatus according to claim 1, further comprising:
a running condition detector detecting running conditions of the electrically driven vehicle, wherein
the controller is further configured to:
change the regenerative braking force from the selected braking force into a braking force smaller than the regeneration level when the electrically driven vehicle is under a predetermined running condition, and
the determining step determines whether or not the regeneration level is acceptable, on the basis of whether or not the changing step is functioning properly.

5. The regenerative braking control apparatus according to claim 4, wherein:
changing step determines a grip limit of a road surfaces on which the electrically driven vehicle is running; and
changes the regenerative braking force from the selected braking force into a braking force smaller than the regeneration level when it is probable that vehicle speed of the electrically driven vehicle exceeds the currently selected regeneration level.

6. The regenerative braking control apparatus according to claim 4, wherein:
the controller is further configured to:
detect any failure in the running condition detector,
wherein: the determining step determines that changing step is not functioning properly, in a case where a failure in the running condition detector is detected in the detecting step.

7. The regenerative braking control apparatus according to claim 1, further comprising:
a sound generator outputting sound to the driver,
wherein: the notifier causes the sound generator to output a predetermined notification sound, when the regeneration level is determined to be unacceptable.

8. The regenerative braking control apparatus according to claim 1, further comprising:

a display providing a visual indication for the driver indicating the selected regeneration level,
wherein: the notifier causes the display to provide different visual indications between when the regeneration level is determined to be unacceptable and when the regeneration level is determined to be acceptable.

9. The regenerative braking control apparatus according to claim 1, wherein:
the determining step determines, repetitively during running of the electrically driven vehicle, whether or not the regeneration level is acceptable;
wherein: in a case where a change in conditions of the electrically driven vehicle occurs after notification that the regeneration level is unacceptable and due to that change the regeneration level is determined to be acceptable, the notifier provides a corresponding notification.

10. The regenerative braking control apparatus according to claim 2, further comprising:
a running condition detector detecting running conditions of the electrically driven vehicle, wherein
the controller is further configured to:
change the regenerative braking force from the selected braking force into a braking force smaller than the regeneration level when the electrically driven vehicle is under a predetermined running condition, and
the determining step determines whether or not the regeneration level is acceptable, on the basis of whether or not the changing step is functioning properly.

11. The regenerative braking control apparatus according to claim 5, wherein
the controller is further configured to:
detect any failure in the running condition detector,
wherein: the determining step determines that changing step is not functioning properly, in a case where a failure in the running condition detector is detected in the detecting step.

12. The regenerative braking control apparatus according to claim 2, further comprising:
a sound generator outputting sound to the driver;
wherein: the notifier causes the sound generator to output a predetermined notification sound, when the regeneration level is determined to be unacceptable.

13. The regenerative braking control apparatus according to claim 3, further comprising:
a sound generator outputting sound to the driver;
wherein: the notifier causes the sound generator to output a predetermined notification sound, when the regeneration level is determined to be unacceptable.

14. The regenerative braking control apparatus according to claim 4, further comprising:
a sound generator outputting sound to the driver;
wherein: the notifier causes the sound generator to output a predetermined notification sound, when the regeneration level is determined to be unacceptable.

15. The regenerative braking control apparatus according to claim 5, further comprising:
a sound generator outputting sound to the driver;
wherein: the notifier causes the sound generator to output a predetermined notification sound, when the regeneration level is determined to be unacceptable.

16. The regenerative braking control apparatus according to claim 6, further comprising:
a sound generator outputting sound to the driver;
wherein: the notifier causes the sound generator to output a predetermined notification sound, when the regeneration level is determined to be unacceptable.

17. The regenerative braking control apparatus according to claim 2, further comprising:
a display providing a visual indication for the driver indicating the selected regeneration level,
wherein: the notifier causes the display to provide different visual indications between when the regeneration level is determined to be unacceptable and when the regeneration level is determined to be acceptable.

18. A regenerative braking control apparatus for an electrically driven vehicle having road wheels and an electric motor for driving the road wheels for running, comprising:
an operation unit allowing a driver of the electrically driven vehicle to select a regeneration level indicating magnitude of braking force to be generated by the electric motor during regenerative braking;
a running condition detector detecting running conditions of the electrically driven vehicle;
a controller configured to:
determine, on the basis of a state of the electrically driven vehicle, whether or not regeneration at the regeneration level selected by the operation unit is acceptable;
change the regenerative braking force from the selected braking force into a braking force smaller than the regeneration level when the electrically driven vehicle is under a predetermined running condition; and
detect any failure in the running condition detector unit; and
a notifier that provided the driver, in a case where the regeneration level is determined to be unacceptable in the determining step, a corresponding notification together with an indication of the regeneration level, wherein:
the changing step determines a grip limit of road surfaces on which the electrically driven vehicle is running, and changes the regenerative braking force from the selected braking force to a braking force smaller than the regeneration level when it is probable that vehicle speed of the electrically driven vehicle exceeds the currently selected regeneration level, and
the determining step determines that the braking force change unit is not functioning properly, in a case where a failure in the running condition detector is detected in the detecting step.

19. The regenerative braking control apparatus according to claim 18, wherein
the controller is being further configured to:
set an Output-Requested-Torque value for the electric motor to be a torque value smaller than the regeneration level in a case where the regeneration level is determined to be unacceptable by the determination unit, while setting Output-Requested-Torque value to be such a regenerative torque value that corresponds to the regeneration level in a case where the regeneration level is determined to be acceptable by the determination unit.

* * * * *